United States Patent [19]

Holzman

[11] Patent Number: 4,998,794

[45] Date of Patent: Mar. 12, 1991

[54] MENISCUS LENS FOR COUPLING AN EXCIMER BEAM INTO AN OPTICAL FIBER

[75] Inventor: Melvyn Holzman, Boulder, Colo.

[73] Assignee: The Spectranetics Corporation, Colorado Springs, Colo.

[21] Appl. No.: 427,476

[22] Filed: Oct. 27, 1989

[51] Int. Cl.⁵ .................................................. G02B 6/32
[52] U.S. Cl. .................................. 350/96.18; 350/96.1; 350/96.15
[58] Field of Search ............... 350/96.15, 96.19, 96.18, 350/96.2, 96.24, 96.25, 96.26

[56] References Cited

U.S. PATENT DOCUMENTS

| | | | |
|---|---|---|---|
| 3,354,319 | 11/1967 | Loewen et al. | 350/96.24 |
| 3,383,622 | 5/1968 | Dixon et al. | 372/71 |
| 3,456,211 | 7/1969 | Koester | 372/6 |
| 3,614,209 | 10/1971 | Seaman | 364/47 |
| 4,411,490 | 10/1983 | Daniel | 350/96.1 |
| 4,529,264 | 7/1985 | Schmidt et al. | 350/96.2 |
| 4,717,227 | 1/1988 | Mori | 350/96.1 |
| 4,732,448 | 3/1988 | Goldenberg | 350/96.18 |
| 4,753,521 | 6/1988 | Deserno | 350/96.18 X |
| 4,842,360 | 6/1989 | Caro et al. | 350/96.18 |

FOREIGN PATENT DOCUMENTS 57-212414 12/1982 Japan ................................. 350/96.18
58-166225 10/1983 Japan ................................. 350/96.18

OTHER PUBLICATIONS

"Laserbeam Shapping for Maximum Uniformity and Minimum Loss", Lasers & Applications, Apr. 1987.
"Gaussian to Flat-Top Distributing Lens", Optics and Laser Technology, Jun. 1982.

Primary Examiner—John D. Lee
Assistant Examiner—John Ngo
Attorney, Agent, or Firm—Cushman, Darby & Cushman

[57] ABSTRACT

An optical fiber coupling system is described including a laser for generating a laser beam through a lens having spherical aberration. The spherical aberration in the lens blurs the focal spot, thereby reducing incident fluence levels over the prior art configurations. To further reduce peak fluence levels, a small obscuration is placed between the laser beam and the lens near the center of the lens. The incident end of the optical fiber is then placed at the point where the cross sectional area of the laser beam is smallest, which is closer to the lens than both the location of peak fluence and the paraxial focal point.

23 Claims, 5 Drawing Sheets

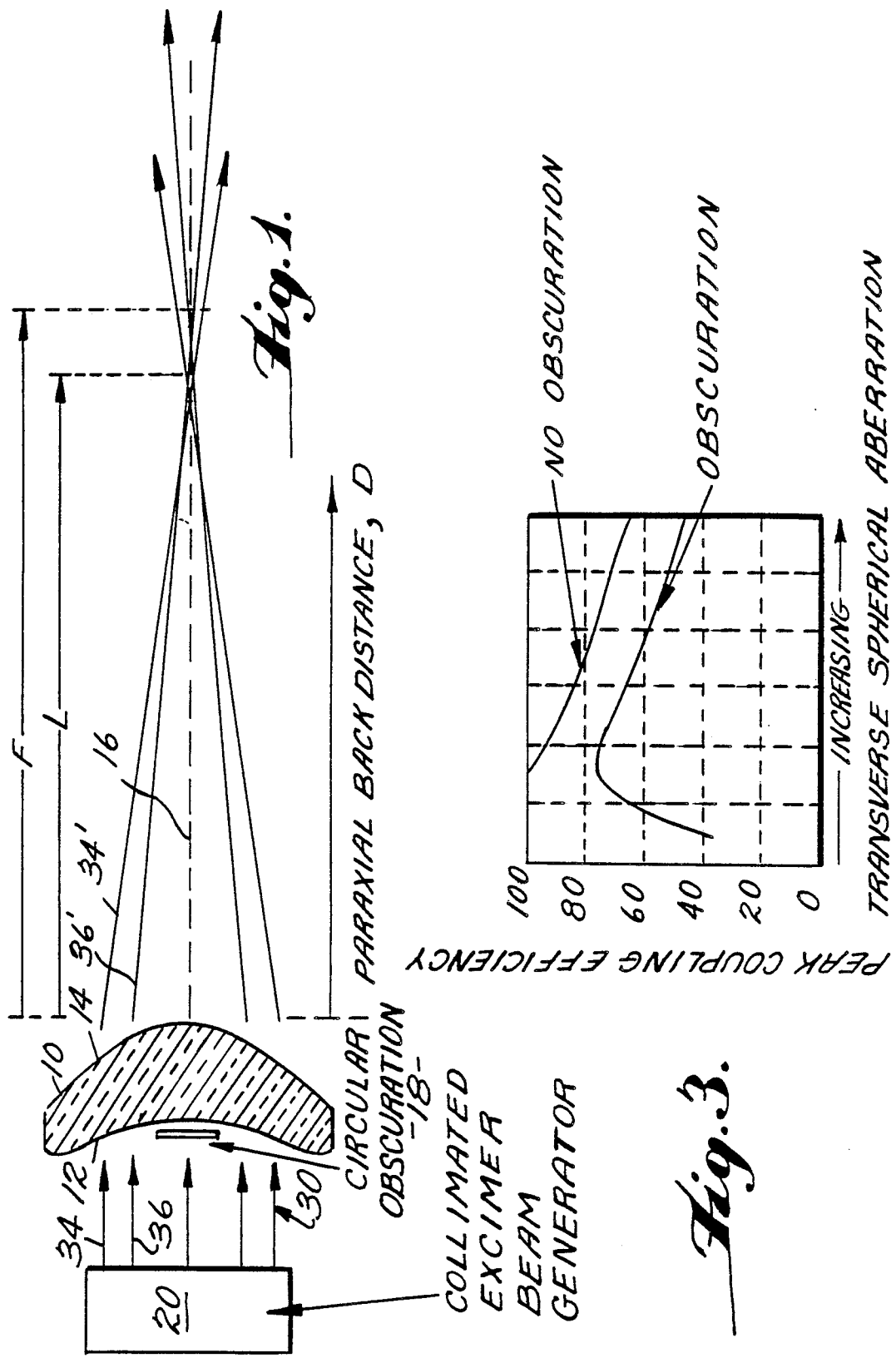

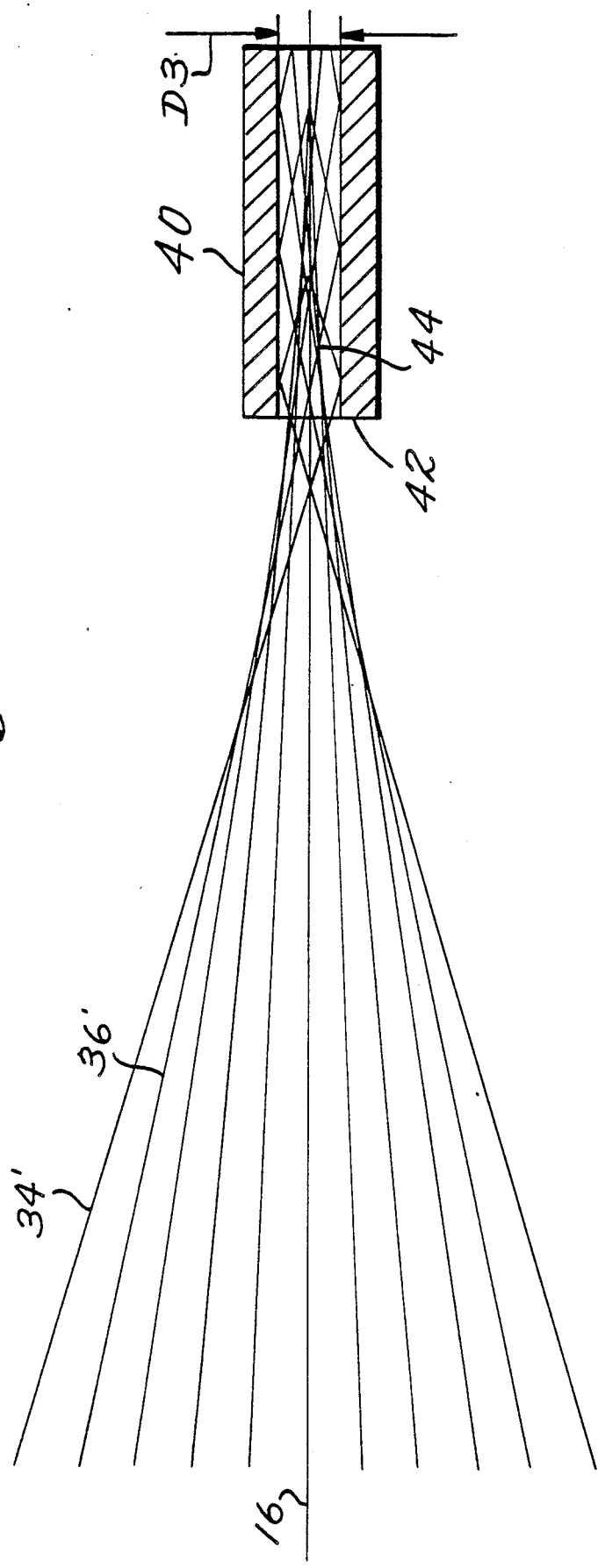

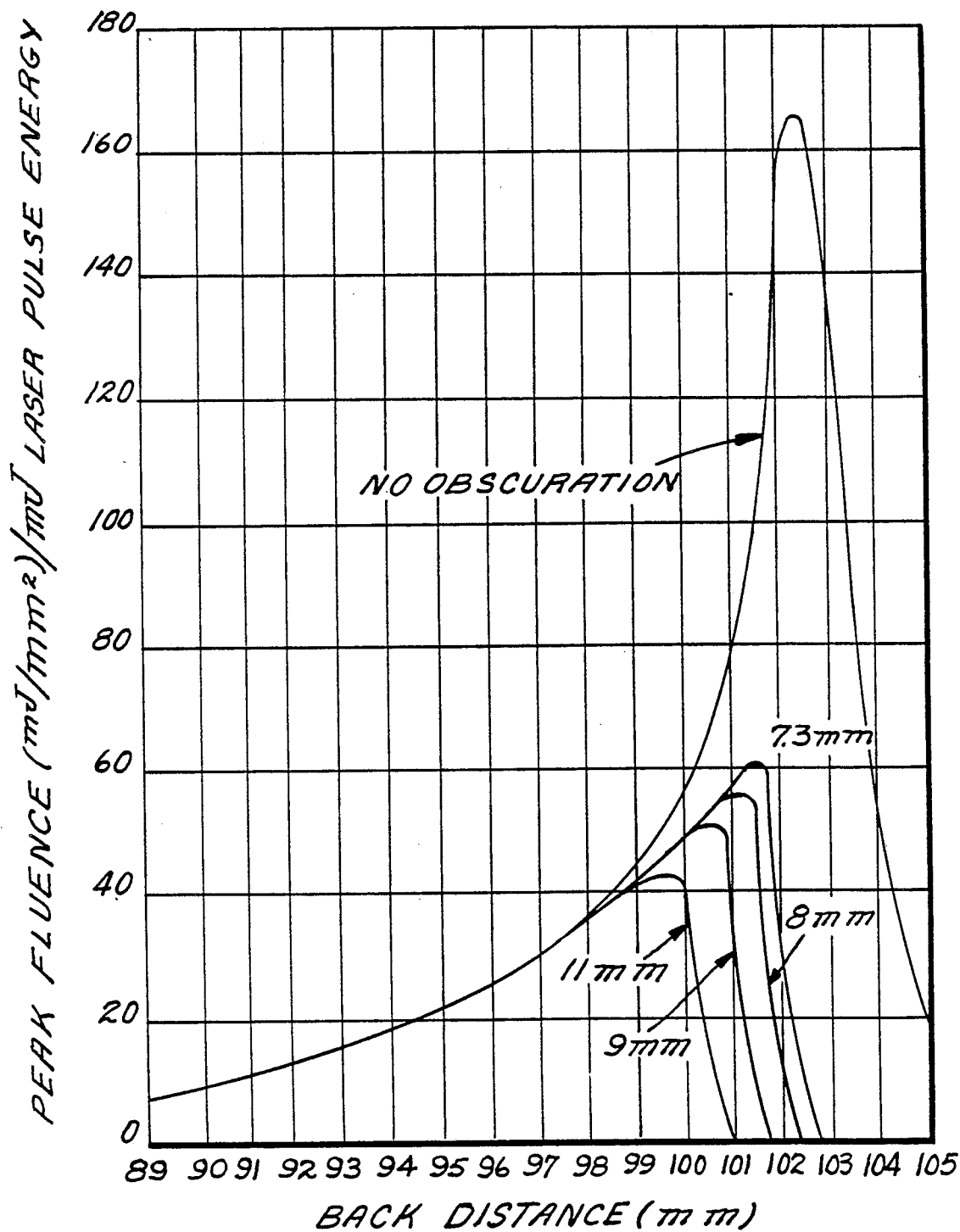

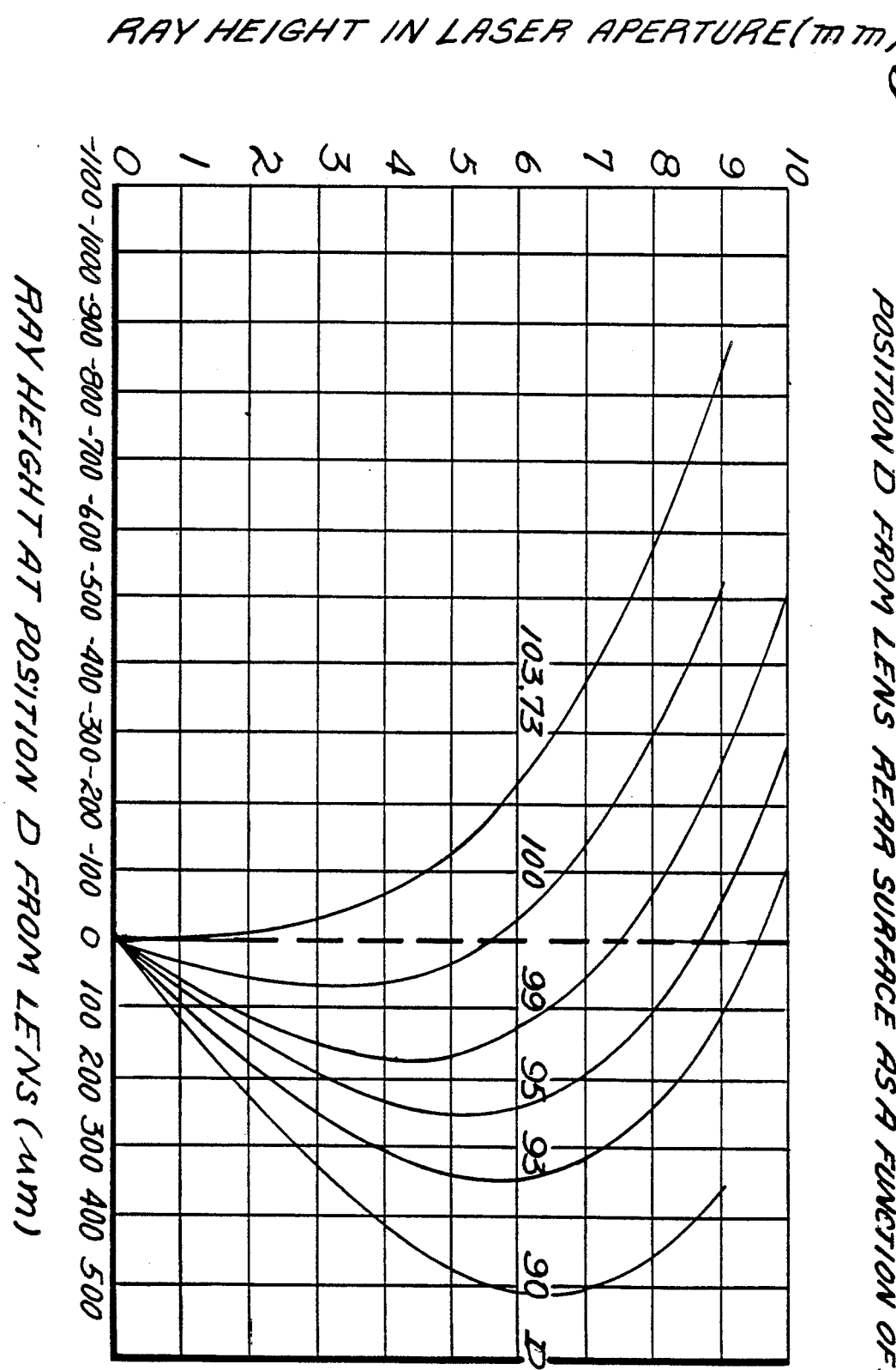
Fig. 5. RAY HEIGHT IN LASER APERTURE VS. RAY HEIGHT AT POSITION D FROM LENS REAR SURFACE AS A FUNCTION OF D

MENISCUS LENS FOR COUPLING AN EXCIMER BEAM INTO AN OPTICAL FIBER

BACKGROUND OF THE INVENTION

1. Field of the Invention

This invention relates to optical couplers More particularly, this invention relates to meniscus lenses to couple excimer beams into optical fibers.

2. Description of Related Art

The ability to couple the beam from a particular excimer laser source into an optical fiber depends on the fluence of the excimer laser beam being less than the fluence damage threshold of the fiber itself. For fused silica fibers, for example, an incident excimer beam of fluence greater than 1000 mJoule/mm$^2$ may damage the fiber when coupled into the fiber end.

With an ideal excimer laser beam having a uniform fluence across the incident end of the optical fiber, the beam fluence could be simply adjusted to be less than the 1000 mJoule/mm$^2$ damage threshold of the incident end of the fiber. Actual excimer laser beams, however, do not have a uniformly distributed output, resulting in some portions of the cross sectional output of the excimer beam having very high fluence levels relative to other portions of the excimer beam. These peak fluence levels within the excimer beam may be due to beam nonuniformity in the lasing operation or may be due to the sharpness of focus by a coupling lens used in conjunction with the excimer beam and the optical fiber.

Traditionally, a plano-convex lens was used to couple an excimer laser beam into an optical fiber. The plano-convex lens converges the excimer beam passing through the lens into an infinitesimal area containing substantially all the excimer energy generated by the laser. The laser energy was thus highly concentrated near the lens focal point, creating potentially damaging fluence levels should the incident end of the optical fiber be placed at the lens focal point. Due to the expectation of high fluence levels in the traditional coupling system, the fiber was restricted to remain away from the focal point to prevent fiber damage.

Homogenizing the fluence levels at the incident end of the optical fiber would permit energy coupling with less possibility of fiber damage. Accordingly, an apparatus and method are needed to reduce the peak fluence levels in the excimer beam energy distribution so a fiber capable of accepting a high level of excimer energy may be coupled into an excimer laser beam without being subjected to fluence levels greater than the damage threshold of the fiber as prior couplers allowed.

Goldenberg, U.S. Pat. No. 4,732,448 discloses a laser-fiber coupler with a collimated laser beam entering a plano-convex lens before being directed into a lensed end of a quartz fiber In this disclosure, the plano-convex lens converges the laser energy into a sharp focal point near the fiber such that the cross sectional area of the converged beam is ideally infinitely small at the focal point With the high laser energy directed into a small cross sectional area, the fluence levels at the focal point may far exceed the damage threshold of the fiber To accommodate, Goldenberg teaches that the fiber should be positioned to accept the converged beam at a distance farther from the plano-convex lens than its focal point. At this distance, the incident end of the fiber sees the converged beam as originating from a point source at the focal point. Past the focal point, the laser beam diverges until it reaches the incident end of the fiber, which includes a lens either integral with the fiber or attached to a plane surface of the fiber to recollimate the diverging laser beam within the core of the fiber.

Focusing the beam with a plano-convex lens may cause a sharp focus spot with high enough fluence levels to damage the incident end of the fiber. The laser energy passing through the plano-convex lens is heavily distributed in the central region of the incident laser spot. Since the total energy coupling capability of the fiber is limited by the peak fluence level in the central region of the nonuniform incident laser spot, the higher fluence level in the central region of the incident spot, created by the plano-convex lens coupling, forces the user to move the fiber beyond the focal point such that the focal spot is external to the fiber.

SUMMARY OF THE INVENTION

The present invention redistributes the laser beam fluence profile to soften the peak fluence spots by spreading the laser energy over the incident end of the fiber to maintain the modified peak fluence levels below the damage threshold of the optical fiber.

To accomplish this objective, a substantially collimated excimer laser beam is passed through a meniscus lens before meeting the incident end of an optical fiber. The meniscus lens contains sufficient spherical aberration to blur the focal spot and reduce the peak fluence levels at the incident end of the optical fiber. The focal spot formed by the meniscus lens consists of the energy from the outer portions of the laser beam profile folded into the inner portions to more uniformly distribute the energy within the focal spot.

In addition, high fluence levels caused by paraxial focussing of the central region of the incident laser beam on the lens may be reduced by blocking a small percentage of the laser energy near the central region of the energy profile using a small obscuration. The size of the obscuration may be small relative to the cross sectional area of the laser beam since the spherical aberration in the meniscus lens preliminarily reduces the fluence by blurring the focal spot such that the reduction in peak fluence attributable to the obscuration may be minimized. Accordingly, power coupling efficiency is only slightly reduced by including the small obscuration.

The meniscus lens may be used alone to redistribute the laser energy profile into one having a more uniform cross section and to reduce fluence levels. Simply changing a plano-convex lens coupler to a meniscus lens coupler with spherical aberration will reduce peak fluence levels between the laser and fiber. The yet remaining fiber damaging central fluence caused by paraxial focussing is reduced below fiber damage threshold by including a small obscuration in the path of the laser beam entering the meniscus lens. In this manner, the possibility of fiber damage is reduced over the prior art, regardless of the fiber position relative to the focal spot.

BRIEF DESCRIPTION OF THE DRAWINGS

In accordance with these and other objectives which will become apparent, the present invention will now be described with particular reference to the accompanying drawings, in which:

FIG. 1 is a cross sectional view of the meniscus lens according to one embodiment of the present invention;

FIG. 2 is a cross sectional view of the optical fiber and laser beam;

FIG. 3 is a graph illustrating the relationships between peak coupling efficiency and transverse spherical aberration, with an obscuration and without an obscuration;

FIG. 4 is a graph illustrating the relationship between peak fluence level and back distance;

FIG. 5 is a graph illustrating the relationship between the ray height in the laser aperture and the ray height at a given back distance for rays parallel to the optical axis.

DETAILED DESCRIPTION OF THE PRESENTLY PREFERRED EMBODIMENTS

Figure 6:
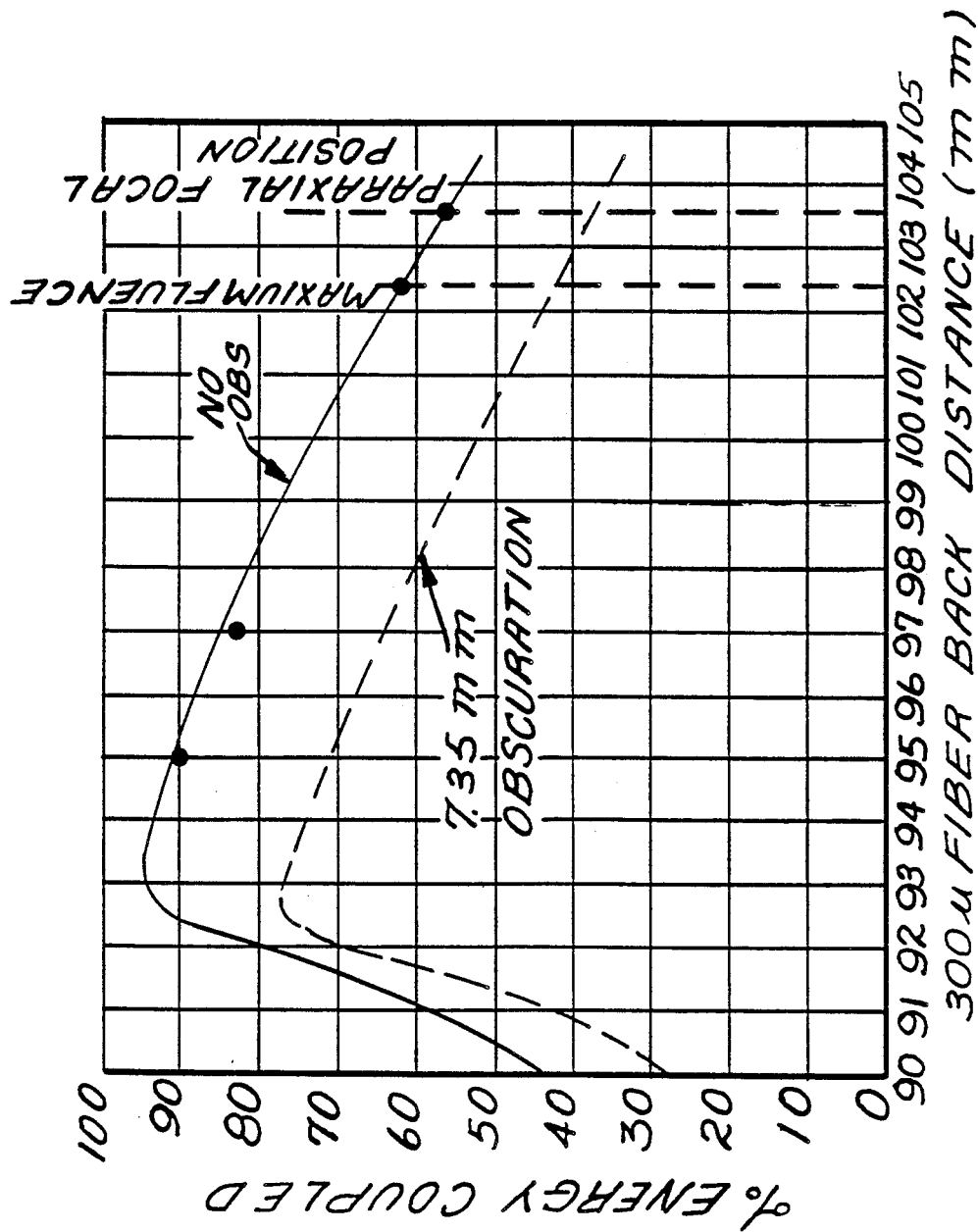
FIG. 6 is a graph illustrating the relationship between the percentage of energy coupled and the back distance.

FIG. 1 illustrates one embodiment of the present invention which is designed to remedy the nonuniformity in the laser profile and to prevent destruction of the input end of a silica fiber because of fluence levels above the silica fiber damage threshold. Throughout this disclosure, including the claims, references to "fiber" should be construed to mean either a single fiber or a fiber bundle.

A meniscus lens 10 includes an input surface 12 which may be convex and an output surface 14 which may be concave. The meniscus lens may be a single lens including the above input and output surfaces or may be multiple lenses.

The meniscus lens defines an optical axis 16 running through the center of the lens. A circular obscuration 18 may be centered at a position on the axis, adjacent to the meniscus lens. The obscuration may be a shape other than circular and be located off center of the axis 16. Further, the obscuration may be adjacent to the meniscus lens, with or without touching the meniscus lens, or may be integral with the lens.

An excimer beam generator 20 directs an excimer beam at the obscuration and lens combination, along the axis 16. The excimer beam generator 20 may be an excimer laser and lens system or may be any means for producing a laser beam which will be known to those of ordinary skill in the art.

The generator 20 produces an excimer laser beam 30 directed toward the obscuration 18 and input surface 12 of the meniscus lens 10. The meniscus lens has sufficient spherical aberration so the excimer rays 34 passing through the meniscus lens 10 near the peripheral edge of the lens are sharply converged, as shown as rays 34' in FIG. 1, and additional rays 36 passing through the meniscus lens 10 nearer the center of the lens 10 are less sharply converged, as shown as rays 36' in FIG. 1. The excimer beam 30 is the composition of all rays parallel to optical axis 16 encountering the meniscus lens and thus, the beam exiting the lens 10 is a compilation of rays converging at differing rates. The resultant beam exiting the meniscus lens 10 is not characterized by a sharp focal point, but, instead is characterized by a location along the axis 16 where the cross sectional area of the sum of all the differently converging rays is minimized. Rather than forming a sharp focal point, the differently converging rays exiting the meniscus lens are mixed, or folded onto each other, as they exit the meniscus lens, creating less intense fluence peaks than the plano-convex arrangement which converges the rays passing through all locations of plano-convex lens toward a single focal point.

The lack of ability of the meniscus lens to have a common focal point for the various rays parallel to the axis 16 before passing through the lens, blurs the cumulative focal spot of the coupled energy beam and redistributes the energy concentration into a larger area than a focussed beam from a plano-convex lens. The blurring effect reduces peak fluence levels thereby reducing the possibility of fiber damage. In addition, the meniscus lens 10 effectively modifies the energy profile in the focussed region by folding the energy in the peripheral regions of the laser beam profile into the central region of the energy profile. Thus, energy which would normally be projected into the heavily concentrated central region of the energy profile by a plano-convex lens is redirected to the less concentrated peripheral regions of the energy profile by the meniscus lens configuration described above. The result is a more uniform energy distribution at the point where the energy is coupled into the optical fiber end. The fact that a true laser beam has divergence further spreads the energy in the focal spot.

Referring to FIG. 2, the end 42 of optical fiber 40 is most advantageously placed at the point where the cross sectional area of the exiting beam is minimized, as shown in FIG. 2. Ideally, optical fiber 40 has an internal core diameter D3 which matches the minimum cross sectional diameter of the exiting laser beam. The distribution of laser energy within the minimum cross section of the beam exiting from the meniscus lens will have reduced peak fluence levels compared to a beam exiting from a plano-convex lens, thus permitting a greater level of laser energy to be coupled into a fiber end without high fluence fiber damage.

In some instances, damagingly high fluence levels will remain in the central region of the energy profile after using the meniscus lens with spherical aberration. Since the meniscus lens will blend the collimated rays that enter the lens, the area of collimated rays which contribute to the high fluence central region will be relatively small compared to the remaining cross sectional area of the collimated beam which will not significantly contribute to the high fluence central region. A small obscuration 18 relative to the diameter of the meniscus lens 10 and collimated beam 30 will adequately reduce the peak fluence in the central region of the exiting beam without significantly reducing the total beam energy being coupled into the fiber since meniscus lens 10 itself is already substantially redistributing the high fluence portions of the energy profile into the lower fluence portions of the energy profile. Accordingly, only a small obscuration 18, near the central axis of the lens 10 and collimated beam will prevent accumulation of laser energy near the high fluence region along the central axis. The same is not true for plano-convex lens couplers. Since the plano-convex lens sharply focuses the rays exiting the lens into a common focal point, a very large obscuration relative to the size of the plano-convex lens and collimated beam would be necessary to reduce the number of rays contributing to the high fluence portions in the region of the common focal point. The large obscuration would so deplete the energy being coupled into the fiber that sufficient energy efficiency with the obscuration would not be attained.

An exemplary configuration of the laser 20, meniscus lens 10 and optical fiber 40 is described below with reference to FIGS. 1 and 2.

A collimated laser beam 30 having a cross-sectional diameter, D1, of approximately 20 mm is incident on a positive meniscus lens with focal length varying from 50 to 150 mm. A circular obscuration 18 has a diameter varying from 4 to 8 mm and is centered on the optical axis at the input side 12 of the lens 10. An optical fiber 40 is positioned with its incident end 42 positioned at the point where the cross sectional area of the exiting beam is smallest, as shown in FIG. 2. The point where the cross sectional area of the exiting beam is smallest occurs at a location, L, between the meniscus lens 10 and the paraxial back focal point, F, and along the optical axis 16 such that the focal point, F, of the meniscus lens 10 lies within the interior of the optical fiber 40.

The physical characteristics of the lens and obscuration in the structure of FIG. 2 depend on the type and size of fiber used. For example, a fiber 40 having a core 44 with an internal core diameter, D3, of 800 microns ideally requires the exiting beam to have a minimum cross sectional diameter equal to 800 microns to spatially fit all the exiting beam into the fiber end 42. Given the 800 micron minimum cross sectional diameter of the exiting beam, the meniscus lens may be designed to create the necessary amount of spherical aberration in the incident beam 30 to prevent sharp focusing and to obtain the requisite 800 micron minimum cross sectional diameter.

Designing the optical coupling system to achieve the objectives described above involves optimizing the size of the obscuration used to block a portion of the laser energy with the extent of spherical aberration induced by the meniscus lens to maximize the energy coupling efficiency and to maximize the peak energy coupling capacity of the laser beam into the optical fiber. FIG. 3 illustrates that the peak coupling efficiency is dependent on the spherical aberration induced by the meniscus lens 10. Equally, the peak coupling efficiency is dependent on the size of any obscuration placed in the path of the collimated beam entering the meniscus lens. As illustrated in FIG. 3, the coupling efficiency has an identifiable peak value for a given obscuration size, from which the degree of spherical aberration designed into the meniscus lens may be determined. The ideal amount of spherical aberration in the lens 10 may thus be determined by choosing the spherical aberration which optimizes peak coupling efficiency for the particular obscuration size used in the coupler.

The size of the obscuration may be determined by reference to FIGS. 4 and 5. FIGS. 4 and 5 are characteristics of a meniscus lens of fused silica having an incident surface convex toward the laser of 23 mm radius and an opposite surface concave toward the laser of 34.51 mm radius. The lens has a focal length of 116.5 mm for an excimer laser wavelength of 308 nm, a paraxial back focal distance, F, of 103.7 mm and is 20 mm in diameter. FIG. 4 illustrates the peak fluence level at a back distance, D, from the lens, along the back axis 16, when the intrinsic laser divergence is included. The curves illustrate, for example, that with incident laser energy of 1 mJoule, the peak fluence level for the lens, without an obscuration, is approximately 167 mJoule/$mm^2$ and occurs at a back distance, D, of approximately 102.7 mm. At the paraxial focal point, F, 103.7 mm, the peak fluence level is approximately 60 mjoule/$mm^2$. FIG. 4 also illustrates that an obscuration of 7.3 mm-11 mm significantly reduces the peak fluence value from 167 mJoule/$mm^2$ to 60 mJoule/$mm^2$ or less.

FIG. 5 illustrates the concentration of laser energy along the optical axis 16 of FIG. 1. The ordinate is the distance between a parallel ray incident to the meniscus lens and the optical axis. A ray at the peripheral edge of the 20 mm diameter lens is described at the top of the ordinate axis, "10 mm" from the optical axis, while a ray directly on the optical axis is described at the bottom of the ordinate axis, "0 mm" from the optical axis. The abscissa is the height of the once parallel ray to the optical axis line at a back distance, D, from the lens, after the ray is converged by the meniscus lens. The respectively converged rays, originated from particular parallel rays, will eventually cross the optical axis and begin diverging from the optical axis. A negative value on the abscissa indicates that the ray height at the given back distance, D, is a measurement of the rays after they cross the axis 16, while they are diverging from the axis 16, and a positive value indicates that the ray height at the given back distance, D, is a measurement of the rays before they cross the axis 16, before they begin diverging.

For example, at the paraxial focal distance, 103.7 mm from the lens, FIG. 4 illustrates that an unobscured lens will create approximately 60 mJoule/$mm^2$ peak fluence for each 1 mJoule of energy generated by the laser, when the intrinsic laser divergence is included. An indication of how the 60 mJoule/$m^2$ peak fluence is related to the laser profile may be identified from FIG. 5. FIG. 5 illustrates that the original laser rays parallel to optical axis 16 contained within, for example, a 6 mm cross sectional spot of the laser beam ("3 mm" from the optical axis on the ordinate axis) are concentrated into a 50 $\mu$m diameter cross sectional spot ("−25 $\mu$m" from the optical axis on the abscissa) at the paraxial focal point, 103.7 mm from the lens. Thus, the center 6 mm diameter of the laser profile contributes to the 60 mJoule/$mm^2$ of peak fluence which is likely to be concentrated into a 50 $\mu$m diameter cross sectional spot at the paraxial focal point, assuming the laser beam is perfectly collimated. Since the laser has some intrinsic divergence and is thus not perfectly collimated, additional energy will fall into the 50$\mu$ area to bring the fluence up to the 60 mJoule/$mm^2$ level.

The ultimate effect identified in the above example is 60 mJoule/$mm^2$ fluence at the paraxial focal point 103.7 mm from the meniscus lens. If a plano-convex lens was substituted for the meniscus lens, energy from the entire laser beam would ideally be concentrated into an infinitesimal cross sectional focal spot. The concentration of energy per area is clearly higher for the plano-convex configuration than for the meniscus lens configuration since a higher energy level is being directed into a smaller cross sectional area in the plano-convex case. Thus, some reduction in the fluence levels is obtained by simply replacing the plano-convex lens with a meniscus lens having spherical aberration.

As mentioned above, the fluence level reduction using the meniscus lens may be additionally improved by inserting obscuration 18 in the path of the laser beam entering the meniscus lens. The size of the obscuration may be determined by reference to FIG. 5. In a lens with little spherical abberation, such as a plano-convex lens, the curve of FIG. 5 corresponding to the focal length would be nearly vertical at the point "0" on the abscissa. At a back distance equal to the focal length of the plano-convex system, all original rays, 0 mm-10 mm from the optical axis, would converge into an infinitesimal area. This concept indicates why an obscuration is ineffective in the plano-convex situation. Since all rays in the 20 mm diameter spot of the original laser beam are focused into an infinitesimal spot, to reduce the fluence level at that single spot requires a large portion of the 20 mm diameter of rays to be blocked from encountering the infinitesimal spot. For each additional portion of rays in the original 20 mm diameter which are permitted to pass through the lens, correspondingly more fluence is created in the infinitesimal spot. Since each ray passing through the lens contributes to the fluency level at the focal spot, the amount of rays passing through the lens must be cut back to the point where the power loss due to the obscuration is so significantly reduced that a reasonable power coupling efficiency cannot be maintained.

In general the amount of energy significantly contributing to the high fluence levels can be determined by the substantially vertical orientation of the focal length curve of FIG. 5. For the situation shown in FIG. 5, an approximately 2 mm radius of the central portion of the laser beam contributes to the peak fluence. Accordingly, if a 4 mm diameter of the original laser energy were blocked, a substantial reduction in peak fluence at the focal point would be realized. Thus, as shown in FIG. 5, a small reduction in the laser energy encountering the central region of the spherically aberrated meniscus lens will substantially reduce high fluence levels caused by sharp focusing.

The preferred embodiment of the present invention is thus conducive to the use of an obscuration to block the bulk of laser power contributing to the peak fluence levels, without losing excessive power coupling efficiency. As shown in FIG. 5, the curve associated with the paraxial focal point, 103.7 mm, is not perfectly vertical, but curves toward (negatively) larger beam "spots" for the more peripherally located original beams. While the original, substantially collimated rays within a central spot of 4 mm diameter (0-2 mm from the optical axis on the ordinate) are focused into a sharp focal spot of approximately 0 $\mu$m at the paraxial focal distance 103.7 mm from the lens, and thus substantially contribute to a central, high fluence spot in the beam cross section at a back distance of 103.7 mm, the original rays closer to the periphery of the lens (7-10 mm from the optical axis on the ordinate) are converged into a relatively large spot of greater than 800 $\mu$m diameter ($-400$ $\mu$m from the paraxial line) at the paraxial focal distance. Thus, unlike the plano-convex case, the meniscus lens does not focus all rays passing at all radial distances on the lens to a single focal point, but, instead focuses each circle of rays passing through the meniscus lens at a given radius toward a different point along the optical axis. This characteristic allows the obscuration in the meniscus lens apparatus to reduce the peak fluence levels at the incident end of the optical fiber without significantly reducing peak coupling efficiency.

As shown in FIG. 5, the rays parallel to the optical axis and passing through the meniscus lens near its peripheral edge (9 mm from the optical axis) are focused at a back distance, D, 93-95 mm from the lens; rays passing through the meniscus lens 5.5 mm from the optical axis are focused at a back distance of 100 mm from the lens; and rays passing through the lens directly through the optical axis are focused at a distance of 103.7 mm. The diversity of focal points of the rays passing through the meniscus lens at different radii ensures that a relatively small obscuration may be used to block most of the laser energy which is significantly contributing to the high fluence point without retarding the laser energy which is less significantly contributing to the high fluence point. For example, as shown in FIG. 5, an obscuration having a 7 mm diameter (3.5 mm from the optical axis on the ordinate) will eliminate the laser energy which would ordinarily cross within a 100 $\mu$m diameter spot at the focal point 103.7 mm from the lens. Thus, the 7 mm obscuration would prevent sharp focusing of the laser beam by blocking the group of rays which would ordinarily cross the optical axis 16 in close proximity to each other near the focal point, thereby preventing potentially damaging fluence levels near the focal point. Since only 7 mm of the original 20 mm diameter laser aperture is obstructed, a relatively large amount of energy remains for coupling into the optical fiber, yet with a substantially reduced peak fluence level.

The size of the obscuration may be chosen based on the volume of rays which gather near the paraxial focal point after being focused by the meniscus lens as indicated in FIG. 5. A balance must then be struck in determining the desireable size of the obscuration. FIG. 5 illustrates that an increased obscuration size will cut out a larger portion of the high fluence central section of the converged beam, yet that a relatively small obscuration size (approximately 7 mm diameter) will cut out a relatively large amount of the rays contributing to the peak fluence center (all rays crossing the paraxial line within an area of approximately 100 $\mu$m diameter at the focal point). FIG. 4 illustrates that for the 7 mm obscuration, peak fluence may be reduced from approximately 167 mJoule/mm$^2$ per mJ of laser energy to approximately 60 mJoule/mm$^2$ per mJ of laser energy, when intrinsic beam divergence is included. FIG. 3 illustrates that peak coupling efficiency is reduced by the inclusion of the obscuration and that peak coupling efficiency decreases with increased obscuration size. By correlating the obscuration size advantages shown in the above curves, a preferred obscuration size to minimize peak fluence while maximizing coupled energy and coupling efficiency may be obtained.

The location of the incident end 42 of the optical fiber 40 may now be determined with reference to FIGS. 4 and 6. FIG. 4 illustrates that the location of peak fluence for the unobscured beam is at a back distance approximately 102.5 mm from the meniscus lens along the paraxial line. This distance where the peak fluence level occurs is closer to the meniscus lens than the paraxial focal point located at 103.7 mm. Similarly, the peak fluence levels for the obscured beams, as shown in FIG. 4, are also located at back distances closer to the meniscus lens than the paraxial focal point.

FIG. 6 identifies locations where the peak fluence point occurs (102.5 mm) and where the paraxial focal point occurs (103.7 mm) on a graph illustrating the energy coupling efficiency as a function of fiber placement. For an unobscured beam, the greatest coupling efficiency occurs when the incident end 42 of the optical fiber 40 is placed approximately 93 mm from the meniscus lens. At this location, the cross sectional area of the converging beam is at a minimum and, ideally, this cross sectional area is equal in size to the core area of the optical fiber. Thus, when the incident end of the 800 $\mu$m fiber described in FIG. 6 is placed at a back distance of 93 mm, the converged beam should have a cross sectional diameter of 800 $\mu$m and will achieve 95% coupling efficiency into the optical fiber. With this arrangement, both the maximum fluence point and the paraxial focal point are located within the optical fiber. Prior art structures taught that the incident end of the optical fiber should be placed further from the lens than the focal point of the converging beam, otherwise potentially damaging fluence levels existed at the input end of the fiber. The embodiment of the present invention described above, however, achieves high energy coupling efficiency with reduced fluence levels by spherically aberrating the excimer beam and placing the incident end of the optical fiber at a location closer to the lens than both the location of maximum fluence and the paraxial focal position.

An additional advantage is gained by the above described embodiment. Ordinarily, the focusing effect of a lens results in a nonuniform distribution of energy toward the central, paraxial region of the focal spot. The spherical aberration imposed by the meniscus lens described above, however, folds the energy which is distributed at the periphery of the laser spot into the energy which is distributed at the center of the laser spot. The resultant laser spot is characterized by more homogeneously distributed energy across the laser beam's cross sectional profile.

A meniscus lens is not a unique embodiment to the present invention. Alternatively, a single double convex lens may be used to create a blurred focal spot to reduce the high fluence levels at the incident end of the optical fiber. Further, a plurality of lenses may be used rather than a single meniscus or double convex lens. The preferred embodiment described above may be realized using an obscuration of 8 mm with a positive meniscus lens of fused silica having a first radius concave toward the laser of 80 mm, a second radius convex to the laser of 34.19 mm. Alternative configurations of the positive meniscus lens include first and second surface radii of 23 mm convex and 34.51 mm concave; 50 mm concave and 27.88 mm convex; or 34.51 mm concave and 23 mm convex, used with obscurations of 7.5 mm, 6.0 mm and 5.3 mm, respectively.

The optical fiber may be composed of fused silica or other materials which will be known to those skilled in the art. The present invention may be used to couple peak power on the order of a megawatt or more.

The laser may be ultraviolet laser.

While the applicant has described the invention in connection with what the applicant considers to be the most practical preferred embodiments, the applicant does not limit the invention to the disclosed embodiments but, on the contrary intends the invention to cover various modifications and equivalent arrangements included within the spirit and scope of the appended claims.

What is claimed is:

1. An optical system, comprising:
   means for generating a laser beam;
   one or more optical fibers for accepting the laser beam; and
   lens means for spherically aberrating the beam to reduce the peak fluence level of the beam to below the damage threshold level of the fiber before the one or more optical fibers accepts the beam.

2. An optical system according to claim 1, wherein the lens means comprises a meniscus lens.

3. An optical system according to claim 2, wherein the meniscus lens is a positive meniscus lens.

4. An optical system according to claim 3, wherein the positive meniscus lens has a focal length between 50 mm and 150 mm.

5. An optical system according to claim 3, wherein the positive meniscus lens has a diameter of substantially 20 mm.

6. An optical system according to claim 1, wherein the means for generating is an ultraviolet laser.

7. An optical system according to claim 1, wherein the means for generating is an excimer laser.

8. An optical system according to claim 1, further including obscuration means for blocking a portion of the beam from reaching the one or more optical fibers.

9. An optical system according to claim 8, wherein the obscuration means is a circular obscuration means.

10. An optical system according to claim 9, wherein the lens means is characterized by an optical axis the circular obscuration being centered at the optical axis.

11. An optical system according to claim 1, where the fiber is composed of fused silica.

12. An optical system according to claim 1, wherein the one or more optical fibers are adapted to accept the beam having a peak power up to approximately one megawatt.

13. An optical system according to claim 9, wherein the circular obscuration means has a diameter between 4 mm and 8 mm.

14. An optical system according to claim 1, wherein:
   the incident end of the fiber includes a core having a core cross sectional area,
   the lens means converges the spherically aberrated beam, and
   the converged beam has a minimum cross sectional area substantially equal to the core cross sectional area.

15. An optical system, comprising:
   means for generating a substantially collimated beam;
   a fiber, having an incident end;
   means for converging the substantially collimated beam onto the incident end of the fiber and for blurring the converged beam at the incident end of the fiber; and
   means for partially obscuring the substantially collimated beam before converging the beam.

16. An optical system, comprising:
   means for generating a substantially collimated beam;
   a positive meniscus lens having a center axis and a paraxial focal length, the beam passing through the meniscus lens; and
   optical fiber means, having an incident end to receive the beam passed through the meniscus lens, the incident end being supported along the center axis closer to the lens than the paraxial focal length,
   the positive meniscus lens includes an edge and a center, the lens converging the beam so the portion of the beam passing through the edge of the lens is converged more rapidly than the portions of the beam passing through the lens closer to the center of the lens, the nonuniformly converged beam having a minimum converged cross section, and
   the incident end of the optical fiber means being supported at the minimum converged cross section.

17. An optical system according to claim 16, wherein the incident end of the fiber includes a core having a core cross section, the core cross section being substantially identical to the minimum converged cross section.

18. An optical system according to claim 16, further including means for partially obscuring the beam passing through the meniscus lens.

19. An optical system according to claim 18, wherein the means for partially obscuring is a circular obscuration.

20. An optical system according to claim 19, wherein:
   the meniscus lens has a diameter of substantially 20 mm, the circular obscuration has a diameter of between 4 mm and 8 mm, and the positive meniscus lens has a focal length between 50 mm and 150 mm.

21. A method of coupling a beam into an optical fiber, comprising the steps of:

substantially collimating the beam;

passing the beam through a lens to spherically aberrate the beam and to create a paraxial focal point; and positioning the optical fiber to accept the beam passed through the lens at a distance closer to the lens than the paraxial focal point.

22. A method according to claim 21, wherein the step of passing is accomplished by passing the beam through a meniscus lens.

23. A method according to claim 21, further including the step of:

partially obscuring the beam.

* * * * *